United States Patent [19]

Limbacher

[11] 4,456,111
[45] Jun. 26, 1984

[54] HYDRAULIC CONTROL SYSTEM FOR A CLUTCH

[75] Inventor: Bernhard Limbacher, Niederwerrn, Fed. Rep. of Germany

[73] Assignee: Fichtel & Sachs AG, Schweinfurt, Fed. Rep. of Germany

[21] Appl. No.: 321,523

[22] Filed: Nov. 16, 1981

[30] Foreign Application Priority Data

Nov. 22, 1980 [DE] Fed. Rep. of Germany ....... 3044048

[51] Int. Cl.³ ...................... F16D 25/08; F16D 23/14
[52] U.S. Cl. .............................. 192/85 CA; 192/91 A; 192/98; 192/30 V; 192/70.13
[58] Field of Search ................ 192/91 A, 85 CA, 98, 192/70.13, 109 F, 30 V

[56] References Cited

U.S. PATENT DOCUMENTS

| 2,135,617 | 11/1938 | Geyer . | |
|---|---|---|---|
| 3,104,000 | 9/1963 | Erickson . | |
| 3,912,058 | 10/1975 | Parkins | 192/91 A X |
| 3,955,660 | 5/1976 | Poon et al. | 192/91 A |
| 4,061,216 | 12/1977 | Sullivan et al. | 192/85 CA X |
| 4,109,773 | 8/1978 | Higgerson et al. | 192/98 X |
| 4,399,898 | 8/1983 | Olschewski et al. | 192/85 CA X |

FOREIGN PATENT DOCUMENTS

| 1480262 | 3/1969 | Fed. Rep. of Germany | 192/91 A |
|---|---|---|---|
| 1964357 | 7/1971 | Fed. Rep. of Germany | 192/109 F |
| 2544921 | 4/1977 | Fed. Rep. of Germany | 192/91 A |
| 2815971 | 10/1979 | Fed. Rep. of Germany . | |
| 765330 | 6/1934 | France | 192/91 A |
| 48215 | 12/1970 | Japan | 192/91 A |
| 1253965 | 11/1971 | United Kingdom | 192/85 CA |

*Primary Examiner*—Rodney H. Bonck
*Assistant Examiner*—David D. House
*Attorney, Agent, or Firm*—Toren, McGeady and Stanger

[57] ABSTRACT

A hydraulically controlled release system for a friction clutch particularly for a motor vehicle including an annular cylinder supported at a transmission housing and having an annular piston operatively engaged therein, the piston being connected with a diaphragm spring control member of the clutch. The end of the piston facing the clutch extends axially into the annular cylinder and the opposite end of the piston which faces the transmission rests against a radially outwardly bent edge of a bearing flange operatively mounted radially within the annular piston and cylinder. The bearing flange is guided with its outer side on the inner side of the annular cylinder and carries a release bearing which is operatively interposed between the diaphragm control spring of the clutch and the release bearing.

13 Claims, 3 Drawing Figures

HYDRAULIC CONTROL SYSTEM FOR A CLUTCH

The invention relates generally to clutch control systems and more particularly to a hydraulically controlled release system for a friction clutch wherein an operating piston and cylinder are arranged concentrically with respect to a primary transmission shaft of a transmission with the cylinder being supported on the housing of the transmission.

A release system of the type to which the present invention relates is known in the prior art for example from German Offenlegungsschrift No. 28 15 971. In this prior art system, two seals are required for sealing of a pressure space, with one seal always having a statically stressed and dynamically stressed sealing lip. Due to the direct arrangement of the release bearing at the structural part which carries one of the two seals, vibrations which are transmitted during operation give rise to the danger that cavitation and consequent wear will result at the dynamic sealing lip.

Accordingly, the present invention is directed toward provision of a hydraulically controlled release system for a clutch which operates with a pulling action, the system providing at least the operational safety of a mechanical system while also maintaining the advantages of a hydraulic system.

SUMMARY OF THE INVENTION

Briefly, the present invention may be defined as a hydraulically controlled release system for a friction clutch operatively interposed between a clutch control member of the clutch and transmission means including a transmission housing and a primary transmission shaft comprising annular cylinder means supported on the transmission housing, annular piston means operatively engaged within said cylinder means, said cylinder means and said piston means being concentrically arranged with respect to said primary transmission shaft, a pressure space defined between said cylinder means and said piston means, hydraulic means in flow communication with said pressure space for driving said piston means to effect operation of said clutch, bearing flange means movably guided radially inwardly of said piston and cylinder means, release bearing means operatively interposed between said bearing flange means and said clutch control member, and a radially outwardly bent edge formed on said release bearing means, said annular piston means including an end face in engagement with said radially outwardly bent edge of said release bearing means for actuating said release bearing means thereby to effect controlled operation of said clutch.

As a result of the structure of the present invention, several advantages arise in that vibrations originating from the clutch will be almost completely isolated or, if they are transferred at all, they will be transferred in such an attenuated form to the hydraulic system and its seals that the service life, and particularly the life of the movable seals, will be considerably increased.

In accordance with a further feature of the invention, an elastic guide ring is provided between the inner diameter of the cylinder means and the bearing flange means. This elastic guide ring serves to provide further vibration damping and additionally permits a certain inclination of the bearing flange means to compensate for errors in alignment between the axis of rotation of the clutch and the fastening means of the release system at the transmission housing.

In accordance with a further feature of the invention, a U-shaped movable seal is provided in the pressure space between the cylinder means and the piston means. This seal is merely loosely inserted between two concentrically arranged cylinder walls and rests with the connecting web of its two dynamic sealing lips at the end face of the annular piston. In a clutch which operates with a pulling action, there is also a considerable advantage in that, although wear of the clutch increases, the entire release system with the annular piston and the seal moves in a direction toward the pressure space and thus will always remain in a region of clean well-formed sealing surfaces.

The annular piston means is preferably provided at its outer periphery with two guide bands which are arranged in appropriate recesses and which operate to reduce sliding friction.

The annular cylinder means is advantageously divided into two sections, with one of the sections containing the connection for the hydraulic means being attached to the transmission housing and also defining the outer guide diameter for the annular piston means. The other of the two sections is formed with an inner guide diameter for the annular piston means and with the guide ring for the bearing flange means.

In accordance with a further feature of the invention, an initial load spring is supported radially inwardly of the annular piston means, with one side of this spring acting at the radially bent edge of the bearing flange means and with the other side acting against the cylinder means. The spring operates to maintain all the parts of the release bearing under an exact, predetermined load when the clutch is engaged and, as a result, rattling noises and wear are reduced or eliminated.

The initial load spring simultaneously serves to secure the bearing flange means against rotation relative to the annular cylinder means. In this manner, application of torque to the annular piston means is avoided.

In accordance with a further detailed feature of the invention, the bearing flange means may be structured in one part together with a non-rotating bearing ring of the release bearing means. It is possible to manufacture the bearing flange means as a sheet metal part and to permit rolling bodies of the release bearing means to run directly in a race formed from this sheet metal part. Additionally, the bearing flange means may be manufactured from solid material.

In accordance with a further specific feature of the invention, assembly and disassembly of the release mechanism are facilitated by provision of a detent for the initial load spring. This detent is constructed in the form of an annular spring located in a groove on the outer periphery of the bearing flange means and adapted to be engaged at an end face of the cylinder means. During a first operation of the clutch, this annular spring is lifted out of its groove due to the release force and it is axially moved until it disappears into a deeper groove.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
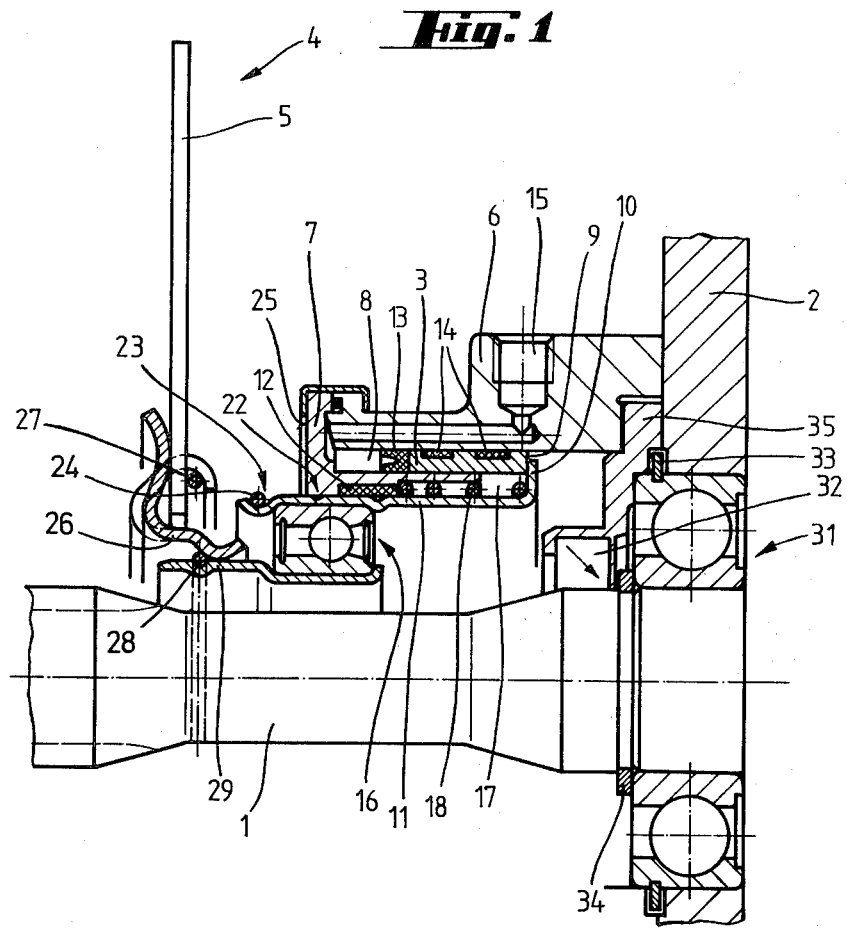
FIG. 1 is a partial longitudinal sectional view showing a hydraulic release system in accordance with the invention.

Referring now to the drawings and particularly to FIG. 1, there is shown a hydraulic release system which is adapted for operation with a clutch 4 operating with a so-called pulling action. For the sake of simplicity, only a diaphragm spring tongue 5 of the clutch 4 is shown, the member 5 being a control member for the clutch. Since a detailed description of the construction of the clutch 4 is not necessary for an understanding of the invention, such a description is omitted.

The entire release system of the invention may be attached at a transmission housing 2 of a transmission mechanism which includes a primary transmission shaft 1 supported by means of a bearing 31 relative to the housing 2. Safety rings 33 and 34 are provided for axially fixing the bearing 31 and the primary transmission shaft 1. A shaft sealing ring 32 is arranged in a cover 35 for sealing of the transmission.

The release system for the clutch is arranged concentrically with respect to the primary transmission shaft 1. It will be seen therefore that in the drawing of FIG. 1, only the upper half of the system is shown. The release system is comprised of a cylinder housing 6 which is provided directly on the transmission housing 2 and which contains a hydraulic connection 15.

The cylinder housing 6 is formed with an inner diameter defining a guide bore within which an annular piston 3 operates. Additionally, the cylinder housing 6 is connected with a cylinder liner 7 which is firmly arranged thereon and which provides in a sealed manner guidance for the inner diameter of the annular piston 3.

Between the annular cylinder means, comprised of the cylinder housing 6 and the cylinder liner 7, and the annular piston means 3, there is defined a pressure space 8 which is connected with the hydraulic connection 15 through appropriate ducts. The pressure space 8 is sealed toward the outside thereof by means of a seal member 13 which is formed with an approximately U-shaped configuration with the two legs of this U-shaped configuration resting as dynamic sealing lips at the cylinder housing 6 and at the cylinder liner 7 and with the connecting member between the two legs of the U-shape lying at the end face of the annular piston 3. The seal 13 is only loosely inserted in its operative position.

The annular piston 3 is provided at its outer periphery with two recesses in which guide bands 14 are placed. The guide bands 14 are usually made of plastic and they operate to guide the piston along its outer periphery essentially without metallic contact with the cylinder housing 6. Alternatively, or in addition to the guide bands 14, guide bands may be provided on the inner periphery of the annular piston 3.

The cylinder housing 6 and the cylinder liner 7 are separately manufactured because it is found easier to separately manufacture the guide surfaces for the annular piston 3 and the seal 13 since they must be formed with some accuracy. However, they are locked firmly and in a sealed manner with one another during operation.

The cylinder liner 7 has at its inner diameter a guide ring 12 which is also preferably manufactured of plastic or some elastic material and which provides guidance for a bearing flange 11.

In the embodiment shown in FIG. 1, the bearing flange 11 is formed as a tubular sheet metal part carrying at its end region facing the clutch 4 a release bearing 16. In the end region of the bearing flange 11 which faces the transmission housing 2, the bearing flange 11 is formed with a radially outwardly bent edge 10 which is engaged behind the annular piston 3.

The annular piston 3 includes an end face 9 which is positioned to engage with the radially outwardly directed edge 10 of the bearing flange 11.

In order to achieve a permanent initial load for the release bearing 16, an initial load spring 18 is arranged on the bearing flange 11 approximately in the region radially inside of the annular piston 3. This initial load spring 18 is supported on one side thereof at the edge 10 of the bearing flange 11 and at the opposite side at the cylinder liner 7 or against a guide ring 12 which is firmly arranged in the cylinder liner 7. In order to secure the spring 18 against rotation, it is formed so that its last windings are bent to extend into appropriate openings in the edge 10 on one side and in the cylinder liner 7 on the other side.

Figure 2:
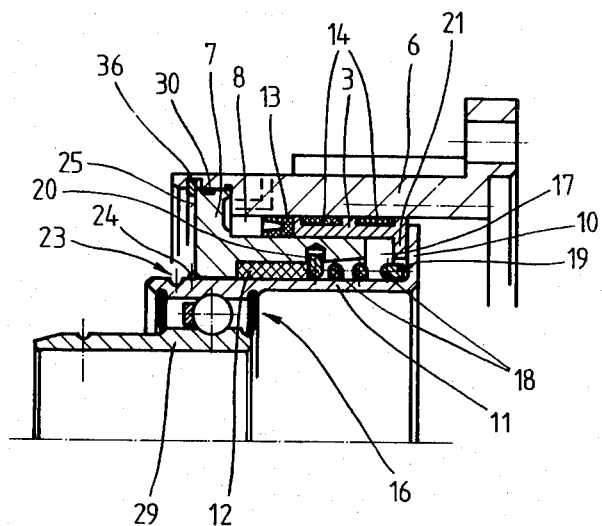
FIG. 2 is a partial longitudinal sectional view showing a further embodiment of the invention.

These spring ends are not shown in FIG. 1, but will be evident from FIG. 2.

Consequently, it will be seen that the initial load spring 18 is arranged in an annular space 17 and serves for effecting permanent contact of all the release parts at the diaphragm spring tongue 5 of the clutch. Spring 18 thus prevents noise and wear and makes available the entire release distance without loss in distance and serves simultaneously to secure the elements against rotation as a result of torque which develops due to vibrations and friction losses in the release bearing 16. This torque may affect the annular piston 3. The initial load spring 18 also holds the guide ring 12 in its exact position. The bearing flange 11 is in the present case constructed as a relatively simple, tubular sheet metal part which carries at its inner periphery the non-rotating bearing ring of the release bearing 16. For this purpose, two stiffening corrugations are formed on the bearing flange 11 so that the non-rotating bearing ring of the release bearing 16 may be axially supported.

The release bearing 16 carries at its rotary bearing ring a connecting tube 29 which extends axially in a direction toward the clutch 4 up to a point radially inside the diaphragm spring tongue 5. At the inner end regions of the diaphragm spring 5, a release ring 26 is arranged which is held at the tongue 5 by means of a bearing ring 27. An extension of the release ring 26 forms, together with a connecting tube 29 and a snap ring 28, a detachable connection. Additionally, at the outer periphery of the bearing flange 11, there is provided a first groove 22 and a second groove 23 with an annular spring 24 being arranged for engagement within one of these grooves, in a manner to be described more fully hereinafter. The parts interact with an end face 25 of the cylinder line 7 during assembly of the clutch and of the transmission.

In the operation of the hydraulic release system shown in FIG. 1, the assembly of the release system in a clutch which is operated by a pulling action may be difficult because of the limited space available and because connection must be established within this limited space which makes possible movement for release of the clutch 4 of the spring tongue 5 or of a release lever away from the clutch in a direction toward the transmission housing 2. In order to facilitate assembly and disassembly of the system shown, the effect of the initial load spring 18 is compensated by inserting the annular spring 24 into the first groove 22. In this manner, the annular spring 24 will rest against the end face 25 of the cylinder liner 7 and both parts will form in the axial direction a firm unit.

During assembly, the connecting tube 29 must be inserted into the release spring 26 and the snap ring 28 must be brought into its position so that it can transfer forces necessary for release of the clutch. During the first operating step of the clutch, a hydraulic pressure is developed in the pressure space 8 by means of the hydraulic connection 15. This hydraulic pressure is transferred through the seal 13 to the annular piston 3. The release force which thus results will be applied in a direction toward the transmission housing and will be sufficiently large so that the bearing flange 11 together with the annular piston 3 will be moved toward the right whereupon the annular spring 24 will be lifted out of the first groove 22 by the end face 25 of the cylinder liner 7 and it will be ultimately brought into engagement within the second groove 23. The annular spring 24 will remain in the groove 23 until disassembly, which may possibly become necessary, occurs and it will be placed before disassembly again into the first groove 22.

Due to the wear at the friction linings of the clutch which has occurred in the interim, all the axially movable parts of the release system move together with the end of the spring 5 to the left so that in any case the first groove 22 will be located outside of the end face 25 of the cylinder liner 7.

Due to the two-part construction in the force transmission path between the cylinder means 6, 7 and the spring tongue 5, i.e., due to the loose contact between the end face 9 of the annular piston 3 and the edge 10 of the bearing flange 11, and also due to the resilient arrangement of the bearing flange 11 by means of the guide ring 12, it is possible to render ineffective any vibrations originating from the clutch 4 which are not completely suppressed. This suppression occurs with regard to the hydraulic release system because the bearing flange 11 and the annular piston 3 are adapted to freely adjust and vibrations thus cannot be transferred at the contact point which extends perpendicularly to the release motion. Thus, the seal 13 is free of mechanical stress resulting from vibrations of the clutch and possibly the release bearing so that the seal must merely undertake the sealing function. Therefore, no cavitation can occur at the two dynamic sealing lips. Additionally, the direction of movement of all the axially movable parts to the left during wear of the clutch linings provides a great advantage in that the seal 13 will always run upon clean and undamaged sealing surfaces. The annular piston 3 and the seal 13 may thus move to the left into the pressure space 8 during the service life of the clutch.

Figure 3:
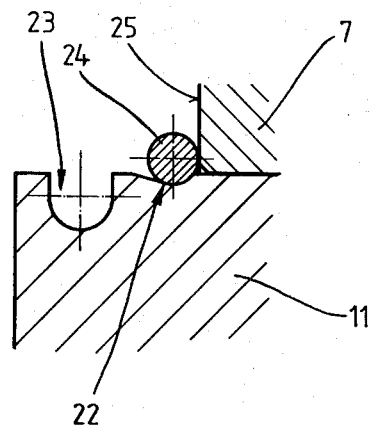
FIG. 3 is a partial sectional view showing on an enlarged scale parts of the system of the invention.

In FIGS. 2 and 3 there is shown a variation or modification of the hydraulic release system depicted in FIG. 1. In FIG. 2, only the upper half of the longitudinal section through the release system itself is shown, and in FIG. 3 the annular spring arrangement which facilitates assembly is shown on an enlarged scale.

The cylinder housing 6 and the cylinder lining 7, as previously indicated, are separately manufactured and are joined together by means of a safety ring 36. They are sealed relative to their exterior by means of a sealing ring 30. In the embodiment of FIG. 2, the pressure space 8 is formed by the cylinder housing 6, the cylinder liner 7 and the annular piston 3, with the seal 13 being approximately U-shaped and resting loosely against the end face of the annular piston 3. The seal 13 forms with its two legs dynamic sealing lips with relation to the cylinder housing 6 and the cylinder liner 7.

The annular piston 3 with its guide bands 14 inserted at its outer periphery has at its end facing toward the transmission a collar 21 which is formed thereon with a radially inwardly extending orientation. The annular piston 3 rests with the collar 21 in the axial direction at the radially inwardly directed edge 10 of the bearing flange 11. The cylinder liner 7 is provided on the inner diameter thereof with the guide ring 12 which provides guidance for the bearing flange 11. The initial load spring 18 is arranged between the end of the guide ring 12 on the transmission side thereof and the collar 21 of the annular piston 3. Here again, the initial load spring functions as protection against torsion between the cylinder liner 7 and the annular piston 3 in that the spring ends 19 and 20 extend into corresponding openings in the collar 21 and the cylinder liner 7.

The connecting tube 29 is in the present case constructed in one piece with the rotary bearing ring of the roller bearing 16.

In FIG. 2, the release system is shown in the assembly position, i.e., with the bearing flange 11 stopped with respect to the cylinder liner 7 in the axial direction by means of the annular spring 24, as shown on an enlarged scale in FIG. 3. The annular spring 24 is located in a first groove 22 which is formed with a depth sufficient only to provide an initial tension of the initial load spring 18 but not sufficient to lift the annular spring 24 out of the first groove 22.

The annular spring 24 may be stripped by the end face 25 due to movement of the annular piston 3 and the bearing flange 11 in a direction toward the transmission during the first clutch operation only after completion of assembly of the system including the clutch, the transmission, and the release system and only after the snap ring 28 has been installed in accordance with FIG. 1 between the connecting pipe 29 and the release ring 26. At this point, the annular spring may be lifted out of the first groove 22 whereby it will fall into the second groove 23 which is of a depth sufficient that the outer contour of the annular spring 24 does not protrude beyond the outer contour of the bearing flange 11.

In this embodiment, the guidance of the bearing flange 11 with the release bearing 16 also occurs by means of the elastic guide ring 12 which permits the bearing flange 11 to adjust to a certain extent with respect to the axis of rotation of the clutch. However, this capacity for adjustment is possible only because the connection between the bearing flange 11 and the annular piston 3 is effected by means of surfaces which extend radially and only an axially directed contact exists. In this way, vibrations originating from the clutch are prevented from being transferred to the annular piston 3 or, if they are transferred at all, they are transferred only to an insignificant degree. Thus, the seal 13 is protected.

While specific embodiments of the invention have been shown and described in detail to illustrate the application of the inventive principles, it will be understood that the invention may be embodied otherwise without departing from such principles.

What is claimed is:

1. A hydraulically controlled release system for a friction clutch operatively interposed between a clutch control member of said clutch and transmission means including a transmission housing and a primary transmission shaft comprising: annular cylinder means supported on said transmission housing, said annular cylinder means comprising a cylinder housing attached to said transmission housing and containing a hydraulic connection for introducing hydraulic fluid into a pressure space, said cylinder housing forming the radially outer side of said annular cylinder means, and a cylinder liner forming the radially inner side of said annular cylinder means; annular piston means operatively engaged within said cylinder means; said cylinder means and said piston means being concentrically arranged with respect to said primary transmission shaft; said pressure space defined between said cylinder means and said piston means; hydraulic means in flow communication with said pressure space for driving said piston means to effect operation of said clutch; bearing flange means movably guided radially inwardly of said piston and cylinder means; a guide ring for said bearing flange means mounted on said cylinder liner; release bearing means operatively interposed between said bearing flange means and said clutch control member; a radially outwardly bent edge formed on said bearing flange means; said annular piston means including an end face in engagement with said radially outwardly bent edge of said bearing flange means for actuating said release bearing means thereby to effect controlled operation of said clutch; and an initial load spring arranged in an annular space between said cylinder liner and said bearing flange means in the region approximately radially within said annular piston means for maintaining continuous contact between said release bearing means and said clutch control member, said initial load spring being supported on one side thereof at said cylinder liner and at the other side thereof at said bent edge of said bearing flange means.

2. A system according to claim 1 further comprising an elastic guide ring arranged at the inner diameter of said annular cylinder means for providing resilient guidance for said bearing flange means.

3. A system according to claim 1 or 2 further comprising an approximately U-shaped seal loosely arranged between said pressure space and a second end face of said piston opposite said end face in engagement with said radially outwardly extending bent edge, said U-shaped seal having two legs which function as dynamic sealing lips with respect to opposed sides of said annular cylinder means and with a connecting web joining said legs of said U-shaped seal resting at said annular piston means.

4. A system according to claim 1 further comprising a pair of guide bands provided on the outer periphery of said annular piston means spaced in the axial direction thereof and operating to prevent sliding friction.

5. A system according to claim 1 wherein said initial load spring is mounted to prevent rotation between at least one of said bearing flange means and said annular piston means relative to said cylinder liner.

6. A system according to claim 5 wherein said initial load spring is formed with bent spring ends engaged within said system to prevent said relative rotation.

7. A system according to claim 5 wherein said initial load spring rests with its last winding facing said clutch at the end face of said guide ring which faces toward said transmission housing.

8. A system according to claim 1 wherein said annular piston means is formed at an end thereof facing said transmission housing with a radially inwardly directed collar against which said bent edge of said bearing flange means rests from the side of said collar facing said transmission housing with said initial load spring having a last winding engaging said collar from the opposite side of said bent edge.

9. A system according to claim 8 wherein a pad of resilient material is arranged between said collar and said bent edge.

10. A system according to claim 1 wherein said release bearing means includes a non-rotating bearing ring and wherein said bearing flange means is constructed in one piece with said non-rotating bearing ring.

11. A system according to claim 1 further comprising a first groove and a second groove formed on said bearing flange means, an annular spring adapted to be mounted within said first groove during assembly of said system, said annular spring operating as stop means for said initial load spring to maintain a basic portion of said system, said annular spring after assembly of said system being engaged by an end face of said cylinder liner during the first operation of said clutch after assembly to be moved out of said first groove into said second groove.

12. A system according to claim 11 wherein said second groove is arranged directly adjacent said first groove and is formed with a depth at least as great as the size of said annular spring.

13. A system according to claim 11 wherein said second groove is formed a distance from said first groove which corresponds to the maximum release distance of said clutch.

* * * * *